United States Patent Office 2,757,182
Patented July 31, 1956

2,757,182

PROCESS OF PREPARING VITAMIN D₂

Leon Velluz, Paris, and Gaston Amiard, Romainville, France, assignors to U C L A F, Paris, France, a corporation of France No Drawing. Original application October 29, 1949, Serial No. 124,504, now Patent No. 2,693,475, dated November 2, 1954. Divided and this application August 18, 1954, Serial No. 450,814

Claims priority, application France January 21, 1949

5 Claims. (Cl. 260—397.2)

This invention relates to vitamin preparations and a method of making same, and more particularly to the preparation of vitamin $D_2$ from precalciferol and its esters.

The present application is a division of our co-pending application Serial No. 124,504, filed October 29, 1949, now Patent No. 2,693,475, and being entitled "New Substance Useful for Preparing Vitamin $D_2$ and Process of Producing Same."

Heretofore, the formation of vitamin $D_2$ was considered a direct function of light energy. Contrary to this accepted theory, we have discovered that vitamin $D_2$ (calciferol) may be produced without light energy and with a small amount of heat energy from a novel substance, which will hereinafter be called "precalciferol."

It is one object of the present invention to provide an industrial process of producing vitamin $D_2$ from precalciferol and its esters.

In accordance with this invention, one procedure for obtaining our new substance is to prepare in the usual manner the irradiation "resin" of ergosterol, then to esterify it, for example with dinitro-3,5-benzoyl chloride, while carefully keeping the temperature below 25° C. at all stages of the process. This step may be followed by chromatographic separation on neutral alumina. From the fraction least strongly adsorbed, an amber colored oil is separated which gradually crystallizes under ligroin. Precalciferol in the form of its dinitrobenzoate is thus isolated, with a yield of the order of 50% of the "resin."

Percentage analysis and cryoscopy show that this dinitrobenzoate of precalciferol, $C_{35}H_{46}O_6N_2$, is an isomer of the dinitrobenzoate of calciferol.

| Analysis | C, percent | H, percent | N, percent | Molec. Weight |
|---|---|---|---|---|
| Computed | 71.2 | 7.85 | 4.7 | 590 |
| Found experimentally | 70.9 | 7.8 | 4.7 | 560 |

The new substance is clearly distinguishable from the dinitrobenzoate of calciferol studied by Windaus, just as it cannot possibly be confused with any of the derivatives previously described in the photochemical formation of calciferol. The table below gives the physical constants published in literature and those determined by the applicants to permit a comparison with those of dinitrobenzoate of precalciferol.

| | Melting Point, degrees | $(\alpha)_D$ Specific Rotary Power |
|---|---|---|
| Ergosterol (dinitrobenzoate) | 203 | $-50°$ ($CHCl_3$) |
| Lumisterol (dinitrobenzoate) | 140–141 | $+24°$ ($C_6H_6$) |
| Tachysterol (amorphous) | | $-70°$ (benzine) |
| Precalciferol (dinitrobenzoate) | 103–104 | $\begin{cases}+30° (C_6H_6)\\+45° (CHCl_3)\end{cases}$ |
| Calciferol (dinitrobenzoate) | 158–159 | $\begin{cases}+57° (C_6H_6)\\+88° (CHCl_3)\end{cases}$ |
| Suprasterol I (dinitrobenzoate) | 154 | $+32°$ ($CHCl_3$) |
| Suprasterol II (dinitrobenzoate) | 180–181 | $-11°$ ($CHCl_3$) |

Dinitrobenzoate of precalciferol crystallizes in fine, very pale yellow needles, while dinitrobenzoate of calciferol forms large crystals which are bright yellow. The best solvent so far discovered for separating the two substances is methylethylketone.

Alkaline saponification of the dinitrobenzoate at 10–15° C. produces the precalciferol in an amorphous state. The specific rotary power of this substance for the D line of the spectrum is in the vicinity of $+43°$ (benzene $c=1\%$), while it is $+85°$ for calciferol.

Subjected to the action of acid chlorides or of acid anhydrides, precalciferol produces esters, the most interesting of which seems to be the dinitrobenzoate already described. Precalciferol is not precipitated by digitonin.

Precalciferol, obtained by saponification of its dinitrobenzoate, exhibits an evolution of its rotary power when heated in a solvent. It thus forms vitamin $D_2$ or calciferol without being subjected to light energy.

The following example serves to illustrate the present invention without, however, limiting the same thereto:

EXAMPLE.—*Preparation of vitamin $D_2$ or calciferol beginning with precalciferol without the supply of light energy and employing only the influence of moderate heating*

A 1% solution of dinitrobenzoate of precalciferol in benzene is heated while sheltered from light, for example, at 60° for 20 hours or for 2 days at 40° C.; or for from 2 to 3 hours at 80° C. The higher the temperature, the shorter the duration of the desired transformation. In practice, it seems preferable not to exceed 80° in order to avoid excessive resinification.

At the start of the process, the specific rotary power is that of dinitrobenzoate of precalciferol in benzene, say $+30°$. Gradually, this rotary power increases and at the end of the process attains a value very close to that of pure dinitrobenzoate of calciferol, in general $+50°$. It suffices to distill off the benzene under reduced pressure, and then to recrystallize in the usual manner to separate the pure dinitrobenzoate of calciferol, melting point 158–159°, $(\alpha)_D=+57°$ ($C_6H_6$). By saponification of its dinitrobenzoate in the usual manner the vitamin $D_2$ is finally obtained.

In the above process, the starting material was the dinitrobenzoate of precalciferol. The preparation may equally well be made by simple heating of free precalciferol, obtained by saponification of its dinitrobenzoate. The rotary power of precalciferol in benzene solution is almost half that of calciferol: $+43°$ instead of $+85°$. In carrying out the heating process just described, the evolution of the rotary power leads, at the end of the process, to a value of the order of $+70°$. The usual concentrations and recrystallizations then accomplish the separation of calciferol. Alternatively, one may proceed to the direct esterification of the heated product, by the chloride of dinitrobenzoyl and obtain an excellent yield of pure dinitrobenzoate of calciferol from which calciferol is liberated by saponification.

In both cases, as has been shown, the new substance for producing vitamin $D_2$ which forms the object of the present invention produced vitamin $D_2$ most satisfactorily under the influence of moderate heating and in the absence of light. However, numerous variations may be employed without departing from the principle of the invention, i. e. the preparation of calciferol from precalciferol.

Precalciferol and its esters as used in the above indicated example is obtained, for instance, in the following manner:

55 grams of ergosterol dissolved in 4,000 cc. of sulfuric ether are irradiated for 2 hours in a nitrogen atmosphere at a temperature of 30° by the light of magnesium sparks.

After distillation of the ether under vacuum at 10–15°, the non-transformed ergosterol (65% of the quantity employed at the start) is eliminated by treatment with methanol, in which it is only slightly soluble. After evaporation of the methanol under vacuum at 30° C., the residual oil is purified of the last traces of methanol by several treatments with benzene. The "resin" thus obtained (19 grams) is esterified in 1 hour at 15° C. in a benzene solution with chloride of dinitro-3, 5-benzoyl in the presence of pyridine. After washings of the benzene solution with a 10% solution of sodium bicarbonate, then with water, and finally with dilute hydrochloric acid, the benzene is removed under a reduced pressure at 10–15°. The crude, oily dinitrobenzoate obtained (30 grams) is dissolved in a mixture of 40 cc. of benzene and 400 cc. of petroleum ether. A slight quantity of indissoluble substance is separated by filtration, and then the solution is chromatographed on a column of 300 grams of neutral alumina. The chromatogram is developed by washing with a solution of petroleum ether containing 10% benzene until the yellow coloration reaches the bottom of the column. The lower half of the alumina column, after the top half has been separated from it, is washed with ether, which results in a yield of 13 grams of crude dinitrobenzoate of precalciferol, which crystallizes upon treatment with a little petroleum ether. After recrystallization by dissolution at 20° in three volumes of methylethylketone and the addition of 5 volumes of absolute alcohol, 10 grams of pure dinitrobenzoate of precalciferol, in fine, pale yellow needles is obtained. Its melting point is 103–104°.

Thus the yield is around 50% by weight of the "resin" with the ergosterol excluded and before esterification.

The precalciferol is obtained by alkaline saponification of the dinitrobenzoate, employing the usual methods, but keeping the temperature always below 15° C.

We claim:

1. In a process of producing vitamin $D_2$, the steps consisting in subjecting precalciferol, said precalciferol being an isomer of calciferol, having a rotatory power $[\alpha]_D$ of about $+43°$ C. (benzene, c=1%), and forming a 3,5-dinitro benzoate having a melting point of about 103–104° C., to moderate heating, to a temperature between about 40° C. and about 80° C., in the presence of a solvent without supplying light energy to the heated mixture, and separating vitamin $D_2$ from the reaction mixture.

2. In a process of producing vitamin $D_2$, the steps consisting in subjecting an ester of precalciferol, said precalciferal being an isomer of calciferol, having a rotatory power $[\alpha]_D$ of about $+43°$ C. (benzene, c=1%), and forming a 3,5-dinitro benzoate having a melting point of about 103–104° C., to moderate heating, to a temperature between about 40° C. and about 80° C., in the presence of a solvent without supplying light energy to the heated mixture, saponifying the resulting vitamin $D_2$ ester into vitamin $D_2$, and separating said vitamin $D_2$ from the reaction mixture.

3. In a process of producing vitamin $D_2$, the steps consisting in subjecting precalciferol dinitro benzoate, said precalciferol dinitro benzoate having a melting point of about 103–104° C. and being an ester of precalciferol, said precalciferol being an isomer of calciferol and having a rotatory power $[\alpha]_D$ of about $+43°$ C. (benzene, c=1%), to moderate heating, to a temperature between about 40° C. and about 80° C., in the presence of a solvent without supplying light energy to the heated mixture, saponifying the resulting ester of vitamin $D_2$ to form vitamin $D_2$, and separating said vitamin $D_2$ from the reaction mixture.

4. In a process of producing vitamin $D_2$, the steps consisting in moderately heating a solution of precalciferol dinitro benzoate in benzene, said precalciferol dinitro benzoate having a melting point of about 103–104° C. and being an ester of precalciferol, said precalciferol being an isomer of calciferol and having a rotatory power $[\alpha]_D$ of about $+43°$ C. (benzene, c=1%), to a temperature between about 40° C. and about 80° C. without supplying light energy to said solution until no further increase in rotatory power takes place, distilling off the benzene in a vacuum, and saponifying the resulting dinitro benzoate of vitamin $D_2$ by means of alkali to form vitamin $D_2$.

5. In a process of producing vitamin $D_2$, the steps consisting in moderately heating a solution of precalciferol in benzene, said precalciferol being an isomer of calciferol, having a rotatory power $[\alpha]_D$ of about $+43°$ C. (benzene, c=1%), and forming a 3,5-dinitro benzoate having a melting point of about 103–104° C., to a temperature between about 40° C. and about 80° C. without supplying light energy to said solution until no further increase in rotatory power takes place, distilling off the benzene in a vacuum, and separating vitamin $D_2$ from the reaction mixture.

References Cited in the file of this patent

UNITED STATES PATENTS

| | | |
|---|---|---|
| 2,099,550 | Windaus | Nov. 16, 1937 |
| 2,216,719 | Boer | Oct. 8, 1940 |
| 2,302,828 | Yoder | Nov. 24, 1942 |
| 2,360,996 | Windaus | Oct. 24, 1944 |
| 2,693,475 | Velluz | Nov. 2, 1954 |

FOREIGN PATENTS

| | | |
|---|---|---|
| 286,275 | Switzerland | Feb. 16, 1953 |